United States Patent
McCauley, Jr. et al.

[11] Patent Number: 5,223,479
[45] Date of Patent: Jun. 29, 1993

[54] PROCESS FOR PREPARING ALKALI METAL-DOPED FULLERENES

[75] Inventors: John P. McCauley, Jr., Folscroft; Qing Zhu, Philadelphia; Gavin Vaughan, Philadelphia; Nicole Coustel, Philadelpha, all of Pa.

[73] Assignee: The Trustees of the University of Pennsylvania, Philadelphia, Pa.

[21] Appl. No.: 738,888

[22] Filed: Aug. 1, 1991

[51] Int. Cl.⁵ .................. H01L 39/24; H01L 39/12; C01B 31/00

[52] U.S. Cl. .................... 505/1; 505/725; 505/775; 505/810; 505/815; 252/500; 252/518; 423/414; 423/439

[58] Field of Search .............. 252/500, 518; 505/1, 505/725, 775, 810, 815; 423/414, 439

[56] References Cited

PUBLICATIONS

Sparn, et al., Science, Jun. 1991, 252, 1154.
Stephens, et al., Nature, Jun. 1991, 351, 632.
Heiny, et al., Phys. Rev. Lett, Jun. 1991, 66, 2911.
McCauley, et al., J. Am. Chem. Soc., 1991, 113, 8537.
Kraus, et al., submitted to Z. Phys B, Jul., 1991.
Holczer, et al., Science, submitted Jul. 1991.
Benning, et al., Reports, Jun. 1991, 1417.
Chen, et al., Science, 1991, 253, 886.
Tycko, et al., Science, Aug. 1991, 253, 884.
Krätschmer, et al., Nature, Sep. 1990, 347, 354.
Hebard, et al., Nature, Apr. 1991, 350, 600.
Rosseinsky, et al., Phys. Rev. Lett., May 1991, 66, 2830.
Holczer, et al., Science, May 1991, 252, 1154.
Tanigaki and Ebbesen, et al., Nature, Jul. 1991, 352. 222.
Wang, et al., Inorg. Chem., 1991, 30. 2839.
Kelty and Lieber, et al., Nature, Jul. 1991, 352, 223.
Fischer, et al., Science, May 1991, 252, 1288.
Zhou, et al., Nature, Jun. 1991, 351, 462.
Poirier, et al., Science, Aug. 1991, 253, 646.
Haddon, et al., Nature, Mar. 1991, 350, 320.
Zhu, et al., Science, Oct. 1991, 254, 545.
Chen, et al., Nature, Aug. 1991, 352, 603.
Fleming, et al., Nature, Aug. 1991, 352, 787.
Fleming, et al., Nature, Aug. 1991, 352, 701.
Zhang, et al., Nature, Sep. 1991, 353, 333.
Wang, et al., Inorg. Chem., 1991, 30, 2962.

Primary Examiner—Paul Lieberman
Assistant Examiner—Bradley A. Swope
Attorney, Agent, or Firm—Woodcock Washburn Kurtz Mackiewicz & Norris

[57] ABSTRACT

Superconducting, metal-doped fullerenes are provided, along with processes for their preparation in relatively high stoichiometric purity. In one embodiment, the processes provide fullerenes of the formula $M_3C_{60}$ where M is an alkali metal. The processes comprise contacting $C_{60}$ with alkali metal in an amount and under reaction conditions effective to produce a compound having the formula $M_yC_{60}$, where y is greater than 3, and contacting said $M_yC_{60}$ with a portion of $C_{60}$ in an amount and under reaction conditions effective to produce said $M_3C_{60}$.

11 Claims, 4 Drawing Sheets 5,223,479

PROCESS FOR PREPARING ALKALI METAL-DOPED FULLERENES

GOVERNMENT SUPPORT

Certain of the inventors have been supported by National Science Foundation MRL Program grant DMR 88-19885.

FIELD OF THE INVENTION

This invention relates to metal-doped fullerenes and, more particularly, to stoichiometrically-controlled methods for their preparation.

BACKGROUND OF THE INVENTION $C_{60}$ is the prototypical member of a family of soccer ball-shaped, aromatic, cage molecules, called fullerenes, which comprise varying numbers of covalently-bound carbon atoms. Macroscopic quantities of fullerenes in solid form were first disclosed by Kratschmer, et al., Nature, 1990, 347, 354, who called the material "fullerene". The mass spectrum, x-ray diffraction data, and infrared and ultraviolet/visible spectra for this material indicated that it contains a mixture of fullerenes, with $C_{60}$ the predominant species and $C_{70}$ present in appreciable amounts. Fullerenes comprising 76, 84, 90, and 94 carbon atoms have also been reported.

Hebard, et al., Nature, 1991, 350, 600, have reported that potassium-doped $C_{60}$ is a superconductor having a superconducting transition temperature ($T_c$) of 18 K. Also, Rossensky, et al., Phys. Rev. Lett., 1991, 66, 2830 have reported that rubidium-doped $C_{60}$ is a superconductor with a $T_c$ of 28 K. Holczer, et al., Science, 1991 252 1154, have confirmed and extended these findings to include the superconducting properties of $C_{60}$ doped with a variety of alkali metals. Holczer, et al. indicate that a single, potassium-doped $C_{60}$ phase —$K_3C_{60}$— is the superconducting phase, with a $T_c$ of 19.3 K, and that neither under- nor overdoped phases are superconducting. In addition, Ebbsen, et al., Nature., 1991, 352 222, have disclosed ternary fullerenes doped with cesium and rubidium having $T_c$ of 33 K.

Despite the apparent utility of metal-doped fullerenes, there presently exists no simple, stoichiometrically-controlled method for their synthesis. Typically, a procedure such as disclosed by Holczer, et al. is employed, wherein a sample of $C_{60}$ is treated directly with a measured portion of the desired metal to give a stoichiometry $M_3C_{60}$. However, since it is generally desirable to use a minimum amount of the relatively expensive $C_{60}$, the amount of metal required typically is quite small and difficult to accurately dispense. Thus, given that the superconductivity of metal doped fullerenes is sensitive to the exact degree of doping, it is difficult to produce materials of controlled superconductivity using procedures such as disclosed by Holczer, et al. Wang, et al., Inorg. Chem., 1991, 30 2838 and Inorg. Chem., 1991, 30 2962, have disclosed a procedure utilizing solution synthesis, but this technique also appears to suffer from problems with stoichiometric control.

Lieber, et al., Nature, 1991, 352, 223, have disclosed a procedure which provides greater degree of control over the stoichiometry of the doping process. This procedure requires the employment of binary alloys comprising both heavy metals and alkali metals wherein the heavy metal serves to decrease the reactivity of the alkali metal. However, Kraus, et al., Z. Phys. B (submitted) have indicated that the heavy metal may actually be deleterious to the superconductivity of the doped material.

Accordingly, it is a one object of the present invention to provide compositions of metal-doped fullerenes comprising a relatively high percentage of the superconducting phase. It is a further object to provide a simple yet stoichiometrically-controlled method for the preparation of such compositions.

SUMMARY OF THE INVENTION

These and other objects are satisfied by the present invention, which provides straightforward, efficient processes for the preparation of a wide variety of metal-doped fullerenes having relatively high stoichiometric purity. In the case of potassium-doped fullerenes, for example, the processes of the present invention have been found to provide relatively high proportions of single phase, superconducting $K_3C_{60}$. In one embodiment of the invention, processes are provided for the preparation of fullerenes of the formula $M_xC_q$, where M is a metal, x is greater than 0 but less than about 10, and q is at least 60. The processes comprise the steps of contacting $C_q$ with metal in an amount and under reaction conditions effective to produce a compound having the formula $M_yC_q$, and contacting said $M_yC_q$ with a portion of $C_q$ in an amount and under reaction conditions effective to produce said $M_xC_{60}$, wherein y is greater than x.

DETAILED DESCRIPTION OF THE INVENTION

Figure 1:
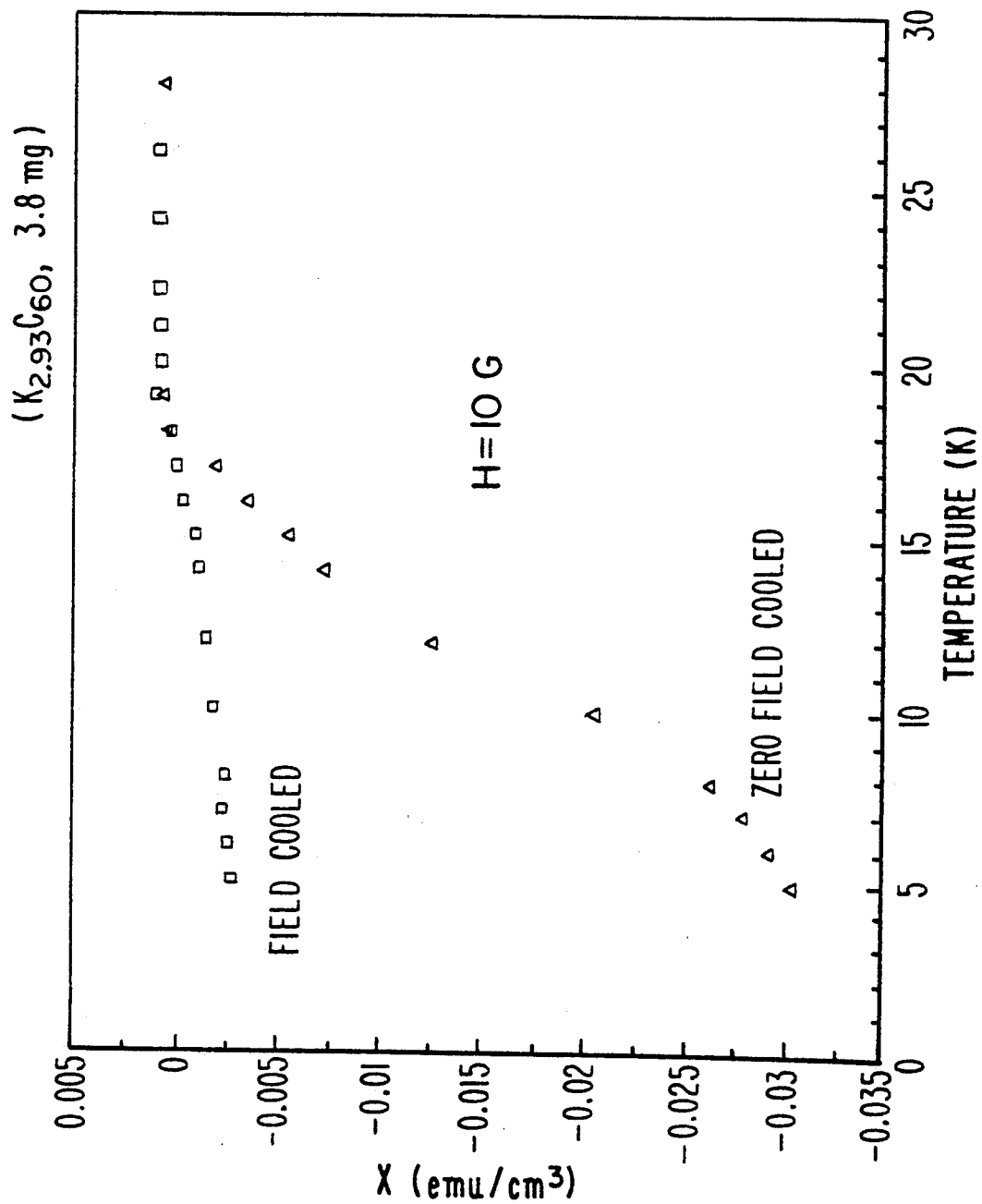
FIG. 1 is a fractional shielding versus temperature curve for a potassium-doped fullerene of the invention.

The method of the present invention preferably are performed with a fullerene composition comprising $C_{60}$ prepared generally in accordance with the method of Fischer, et al., Science, 1991, 252, 1288. It will be recognized, however, that the present methods are not limited to such methods and products, but can be applied to any fullerene having the formula $C_q$ known in the art or yet to be discovered, including $C_{70}$, $C_{76}$, $C_{84}$, $C_{90}$, and $C_{94}$, and combinations thereof.

In preferred embodiments, a first portion of the fullerene composition is contacted with metal, M. While any of a wide variety of metals can be employed, preferred metals include the alkali metals, i.e., metals of group 1A of the periodic table, including lithium, sodium, potassium, rubidium, cesium, and francium, and combinations thereof with each other and with other metals. Preferred alkali metals are potassium, rubidium and cesium. Potassium and rubidium are particularly preferred.

The metal doped fullerenes ultimately prepared in accordance with the present invention should have the formula $M_xC_q$, where x is an greater than 0 but less than about 10. It is preferred that x be about 2-4 and even more preferred that x be about 3. For some metal-doped fullerenes, other proportions may be desireable. Compounds have the formula $M_xC_q$ are prepared by first preparing a more fully doped fullerene —preferably a metal-saturated fullerene —and then diluting the more fully doped moiety by contacting it with an amount of non-doped fullerene, $C_q$. The more fully doped moiety typically has the formula $M_yC_q$, wherein y is greater than x, preferably about 3–12, more preferably about 4–8, even more preferably 6.

In preferred embodiments, one equivalent of the fullerene $C_q$ is contacted with at least y equivalents of metal generally according to the procedure of Zhou, et al., Nature, 1991, 351 462. The amount of $C_q$ to be doped can be accurately weighed outside a drybox, then treated with a 2 to 3 fold excess of the desired metal at about 225° C. under vacuum. Excess metal is easily removed by application of a thermal gradient during cooling. In practice, weight uptakes of metal by $C_{60}$ are consistently slightly greater than expected for $M_6C_{60}$ (i.e., greater than 6 equivalents but less 7 equivalents). Where this occurs, the amount of $C_{60}$ subsequently employed to dilute such material is increased correspondingly.

The more fully doped species can be diluted in a dry box by addition of a second, previously weighed portion of $C_q$ to give a proper stoichiometry. For example, one equivalent of $M_6C_q$ powder should be diluted with one equivalent of $C_q$ powder to provide $M_3C_q$. The powders preferably are ground together in the dry box. After the ground sample is sealed under vacuum in an ample, it is heated for about 24 hours at a temperature from about 150° C. to about 450° C., preferably about 250° C. It is then annealed at a temperature from about 150° C. to about 450° C., preferably about 350° C., for at least about 24 hours then at a temperature from about 150° C. to about 450° C., preferably about 400° C., for about 1 hour. Alternatively, it is annealed at a temperature from about 150° C. to about 450° C., preferably about 350° C. for longer than 24 hours. Annealing is believed to be an important step in the process, since the $M_3C_{60}$ material produced after treatment at 250° C. is a non-equilibrium mixture of phases comprising an average doping level of three metal atoms per $C_{60}$ molecule. After sufficient heat treatment, a single phase compound having the formula $M_3C_{60}$ is formed.

Single phase materials having a face centered cubic structure were prepared in this manner for both $K_3C_{60}$ and $Rb_3C_{60}$. This synthetic method appears to be particularly effective in the case of rubidium doping, since single phase $Rb_3C_{60}$ has not been described in the prior art. The production of ternary species is also possible using combinations of fully coped $C_q$ with proper proportions of undoped $C_q$. Such materials have been synthesized in order to investigate the phase boundaries of undoped face centered cubic $C_q$; face centered cubic $M_xC_q$ where x is from about 3 to about 6; and fully doped body centered cubic $M_xC_q$. These studies indicate that the dilution technique of doping presently disclosed is fundamentally different from direct stoichiometric metal addition to $C_{60}$, in that different phases and phase boundary crossings are observed.

Figure 2:
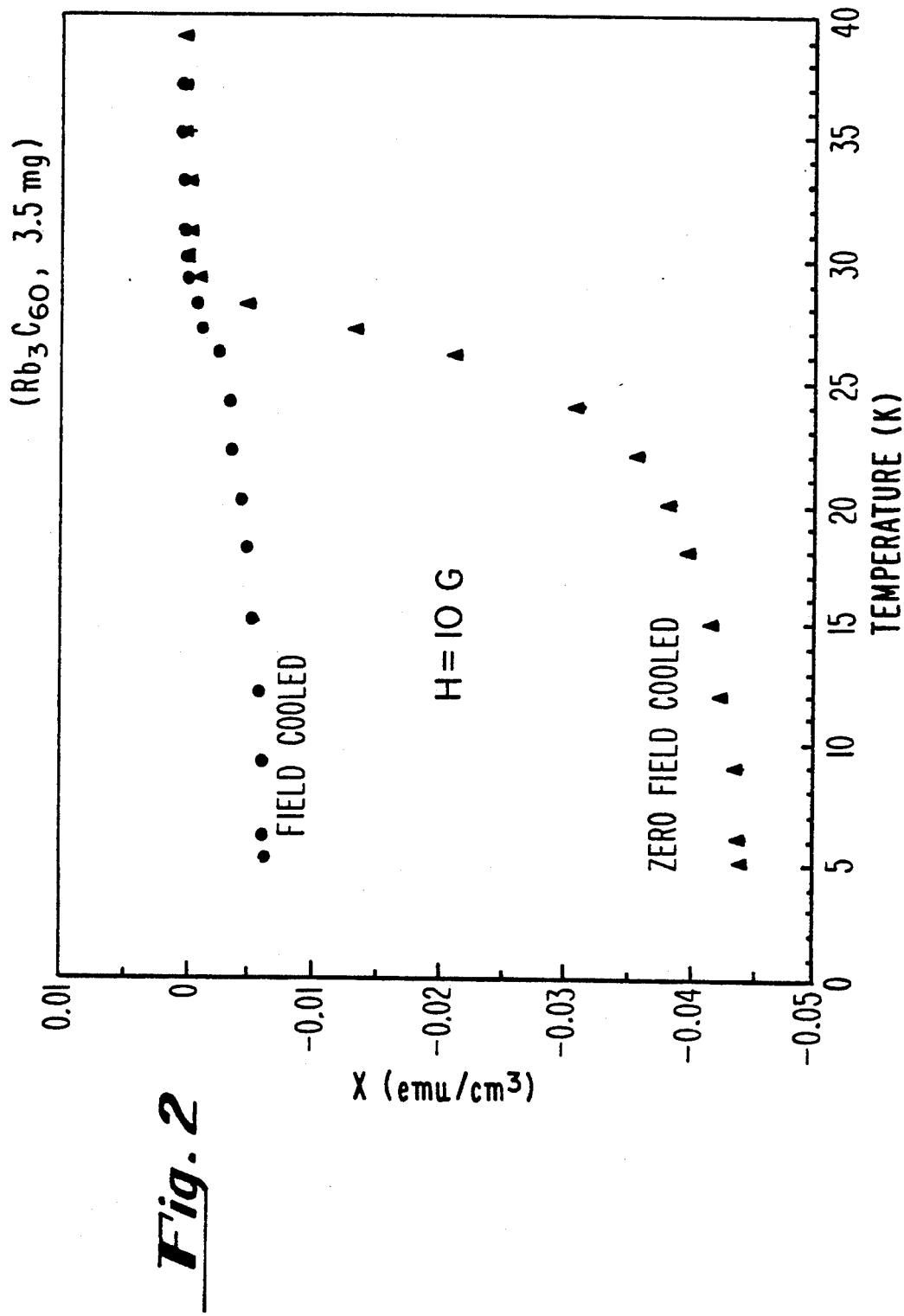
FIG. 2 is a fractional shielding versus temperature curve for a rubidium-doped fullerene of the invention.

Diamagnetic shielding and powder x-ray diffraction (XRD) measurements were performed on the $M_3C_{60}$ materials of the invention. The magnetization measurements were achieved through the use of a superconducting quantum interference device (SQUID). The measured zero field cooled diamagnetic shielding fractions were up to 38% with a $T_c$ of 19.3° C. for potassium powder samples and up to 56% with a $T_c$ of 28.4° C. for rubidium doped powder samples. These shielding fractions were determined, as disclosed by Hebard, et al, by calculating the volumes of the samples from their respective weights and densities, measuring electromagnetic units per unit volume to determine their volume shielding values, and comparing the respective volume shielding values to that of a theoretically perfect superconductor. The fractional shielding versus temperature curve is shown for a potassium sample in FIG. 1 and for a rubidium sample in FIG. 2. Discrepancies between perfect (100%) superconductors and the measured values are believed to be due to the powder morphology. Sparn, et al., Science, 1991, 252, 1154 and Stephens, et al., Nature, 1991, 351, 632 have demonstrated that single phase $K_3C_{60}$ powders showing moderate superconducting fractions can become 100% superconducting when pressed into pallets. We anticipate similar behavior for the powders of the present invention.

Powder XRD measurements were performed at Brookhaven National Synchrotron Light Source using Exxon beamline X10A at a wavelength of 1.5289 anstroms. XRD data of $K_3C_{60}$ prepared by the present methods shows a structure which is, in essence, identical to that reported by Stephens, et al. Using XRD, it appears that the superconducting material $Rb_3C_{60}$ is essentially single phase and also has a face centered cubic structure with a slightly larger lattice constant (14.39 anstroms for $Rb_3C_{60}$ vs 14.24 angstroms for $K_3C_{60}$) with metal atoms distributed in the octahedral and tetrahedral sites. All reflections can be indexed on face-centered cubic lattices. The peak intensities can be modeled with equally good agreement using a spherical shell model of charge distribution for the $C_{60}$ molecules, such as disclosed by Heiny, et al., Phys. Rev. Lett, 1991, 66, 2911, for the structural model of $C_{60}$. This implies a high degree of orientational disorder for $C_{60}$ molecules in the rubidium-doped superconducting phase structure. This is in contrast to the model proposed by Stephens, et al. for the $K_3C_{60}$ species, wherein the $C_{60}$ molecules were oriented in only two possible geometries. A determination of the presence of such disorder may have import toward studies of the mechanism of superconductivity in these systems.

Figure 3:
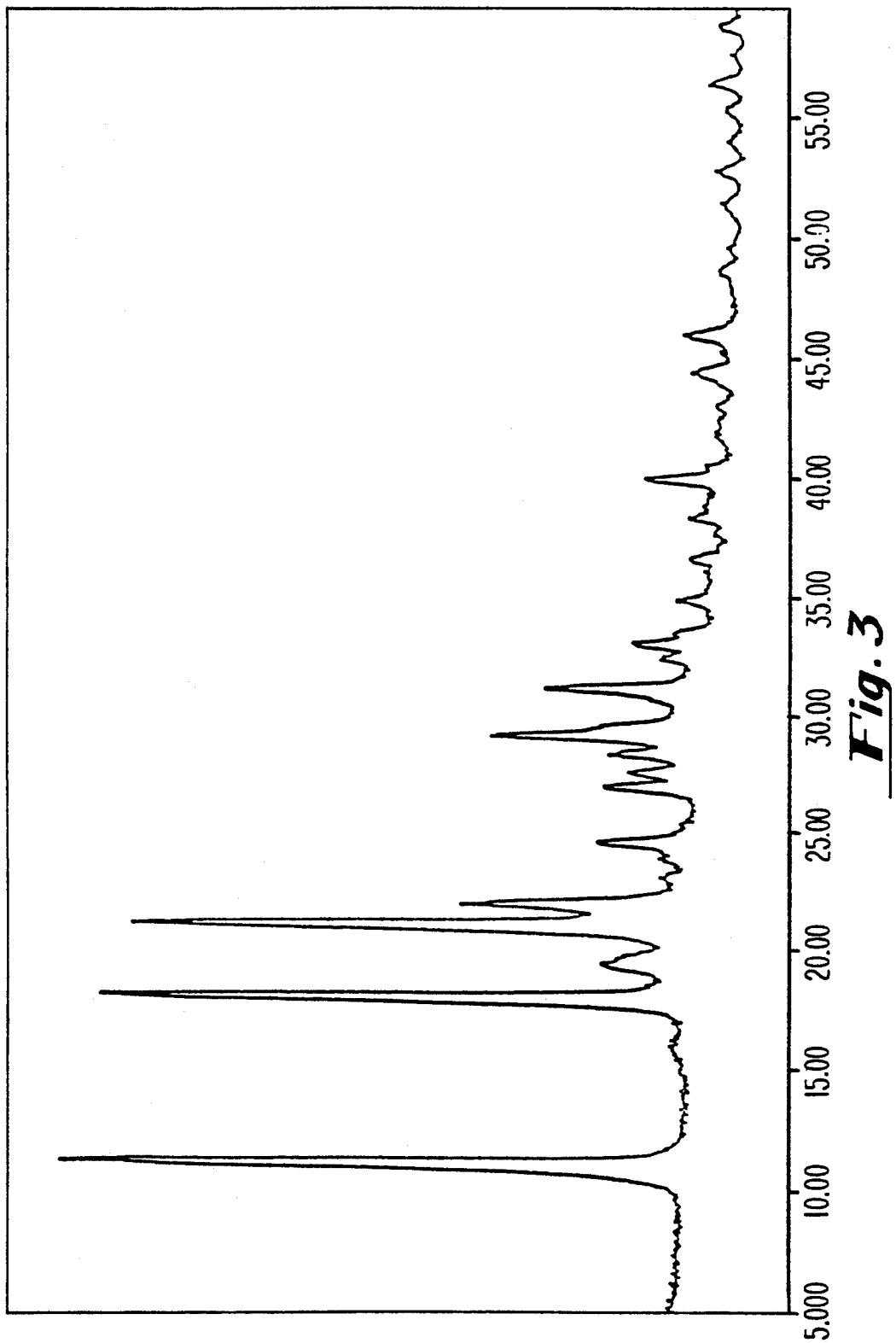
FIG. 3 is the XRD spectra for a mixture of face centered cubic undoped $C_{60}$, body centered cubic $K_6C_{60}$, and body centered cubic $Rb_6C_{60}$.
Figure 4:
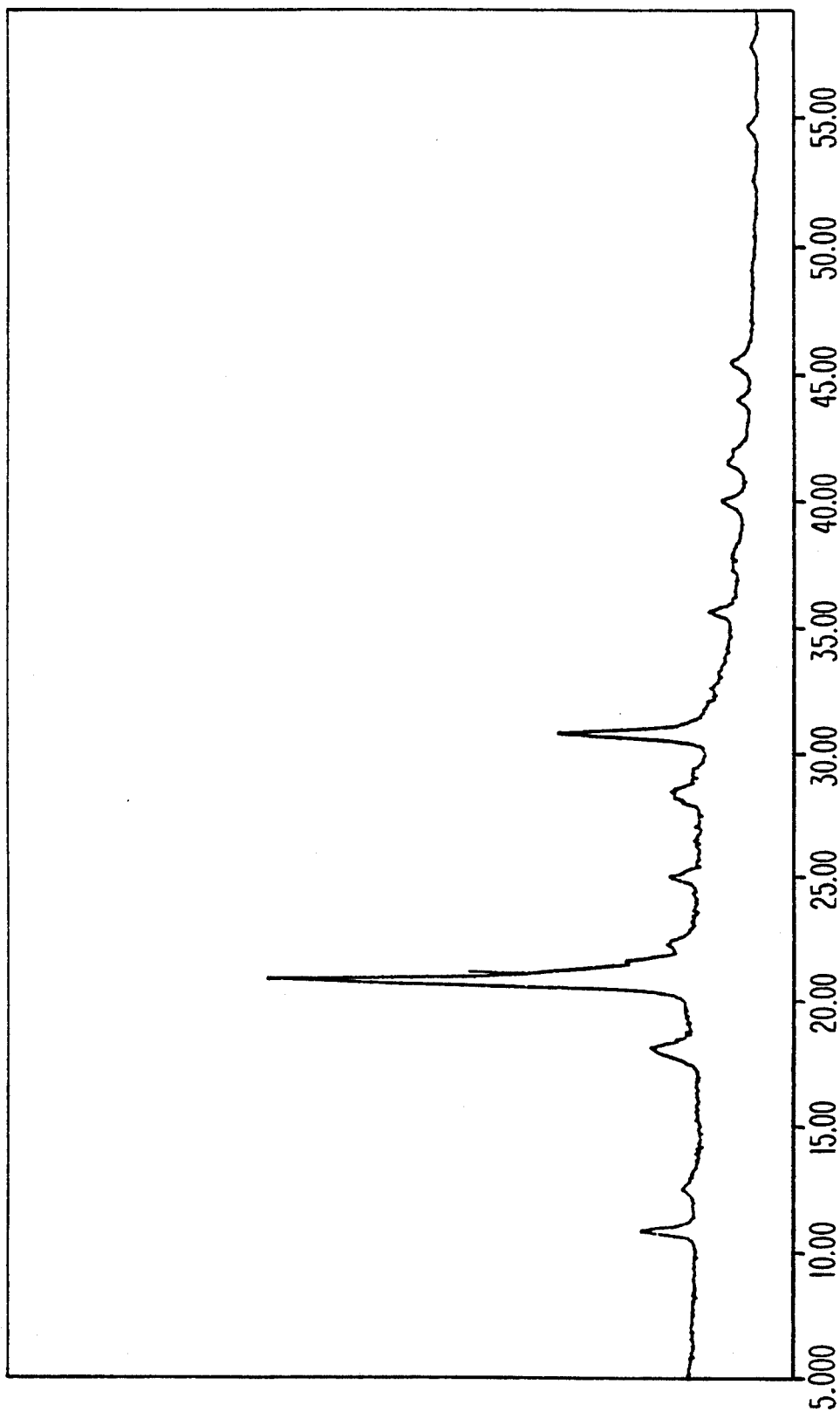
FIG. 4 is an XRD spectra typical of face centered cubic $M_3C_{60}$.

XRD spectra also indicate that dilution doping according to the present invention is also an effective method for the preparation of ternary compounds doped with more than one metal. For example, FIGS. 3 and 4 show XRD spectra before and after mixing $M_5C_{60}$ (M=K, Rb) and $C_{60}$. FIG. 3 shows a mixture of face centered cubic undoped $C_{60}$, body centered cubic $K_6C_{60}$, and body centered cubic $Rb_6C_{60}$. FIG. 4 is an XRD spectra typical of face centered cubic $M_3C_{60}$. The undoped face centered cubic $C_{60}$ and the face centered cubic $M_3C_{60}$ are clearly distinguishable by peak intensity differences and by lattice constant.

Those skilled in the art will appreciate that numerous changes and modifications may be made to the preferred embodiments of the invention and that such changes and modifications may be made without departing from the spirit of the invention. It is therefore intended that the appended claims cover all such equivalent variations as fall within the true spirit and scope of the invention.

What is claimed is:

1. A process for preparing a compound having the formula $M_3C_{60}$ where M is a metal selected from lithium, sodium, potassium, rubidium, cesium, francium, or combinations thereof, comprising the steps of:

contacting $C_{60}$ with said metal in an amount and under reaction conditions effective to produce a compound having the formula $M_yC_{60}$ where y is greater than 3; and contacting said $M_yC_{60}$ with $C_{60}$ in an amount and under reaction conditions effective to produce said $M_3C_{60}$.

2. The process of claim 1 wherein M is potassium, rubidium, cesium, or combinations thereof.

3. The process of claim 1 wherein 1 equivalent of said $C_{60}$ is contacted with at least 6 equivalents of said metal.

4. The process of claim 1 wherein said $C_{60}$ is contacted with said metal at a temperature from about 150° C. to about 450° C.

5. The process of claim 1 wherein said $C_{60}$ is contacted with said metal at a temperature about 250° C.

6. The process of claim 1 wherein y is about 3 to about 12.

7. The process of claim 1 wherein y is about 4 to about 8.

8. The process of claim 1 wherein y is about 6.

9. The process of claim 1 wherein on equivalent of said $M_yC_{60}$ is contacted with 1 equivalent of said $C_{60}$.

10. The process of claim 1 wherein said $M_yC_{60}$ is contacted with said $C_{60}$ at a temperature from about 150° C. to about 450° C.

11. The process of claim 1 wherein said $M_yC_{60}$ is contacted with said $C_{60}$ at a temperature about 350° C.

* * * * *